United States Patent [19]

Thurlow et al.

[11] Patent Number: 4,683,749
[45] Date of Patent: Aug. 4, 1987

[54] PROCESS AND SYSTEM FOR DETECTING AND MEASURING A TRITIUM GAS LEAK

[75] Inventors: Norman C. Thurlow, Horseheads, N.Y.; Robert M. Hruda, Bradenton, Fla.

[73] Assignee: Westinghouse Electric Corp., Pittsburgh, Pa.

[21] Appl. No.: 866,182

[22] Filed: May 22, 1986

[51] Int. Cl.⁴ ............................................. G01M 3/20
[52] U.S. Cl. ...................................................... 73/40.7
[58] Field of Search .................. 73/40.7, 19; 250/288, 250/289

[56] References Cited

U.S. PATENT DOCUMENTS

| | | | |
|---|---|---|---|
| 3,247,706 | 4/1966 | Rose et al. | 73/40.7 |
| 3,672,207 | 6/1972 | Cramp et al. | 73/40.7 |
| 3,731,523 | 5/1973 | Vissers et al. | 73/19 |
| 4,255,963 | 3/1981 | Down | 73/19 |
| 4,492,110 | 1/1985 | Bergquist | 73/40.7 |

Primary Examiner—Stewart J. Levy
Assistant Examiner—Joseph W. Roskos
Attorney, Agent, or Firm—E. C. Arenz

[57] ABSTRACT

The present invention is a method and system for detecting and measuring a tritium gas leak. The method comprises collecting and concentrating any tritium gas escaping from a container in a reservoir over a predetermined time period. The concentrated gas sample is then directed to at least one of two detectors, a highly sensitive ion chamber or a highly sensitive proportional counter. The activity of the gas sample, as indicated by one or both of the detectors, is related to the concentration time interval to provide a measurement of sample activity accumulated per unit time. Calibration with a known tritium leak allows the sample activity per unit time to be read as a leak rate.

10 Claims, 2 Drawing Figures

1

PROCESS AND SYSTEM FOR DETECTING AND MEASURING A TRITIUM GAS LEAK

BACKGROUND OF THE INVENTION

1. Field of the Invention

The present invention is in the field of gas leak detection and measurement and is specifically concerned with the detection and measurement of radioactive tritium gas leaks.

2. Description of the Prior Art

It is essential that sealed containers of tritium gas be determined to be free of any leaks before the containers are handled by plant personnel or moved into production areas.

Flow-through type detector systems are currently used to detect escaping tritium gas. In this type of detector system a container containing tritium is disposed in a chamber, an inert gas, as for example, argon is caused to flow through the chamber around the container of tritium gas through the associated plumbing and through an ionization chamber. In the ionization chamber, the gas sample passes between two electrodes disposed within the chamber. The electrodes are connected to an ammeter outside of the chamber. If the gas sample completes a dc electrical circuit between the electrodes, the current flow is measured on the ammeter. Any reading at all on the ammeter is an indication of the presence of tritium gas. The amount of current measured by the ammeter can be equated to the amount of tritium gas in the sample.

This prior art detection process dilutes the tritium gas be dispersing it throughout the test chamber, the ionization chamber and the associated plumbing. This dilution of the sample reduces the sensitivity of the system and increases the processing time necessary to obtain statistically significant results.

The process often requires from 30 to 40 minutes of running time. Such a lengthy period of running can and frequently does, result in electromagnetic interference which manifests itself as noise in the counting system, thus making the readings unreliable.

SUMMARY OF THE INVENTION

The present invention is directed to a method for detecting and measuring a tritium gas leak, comprising; disposing a sealed container containing a quantity of tritium gas in a chamber, collecting and concentrating a sample of gas from said chamber in a reservoir over a predetermined time period, heating and releasing said sample from the reservoir and introducing said sample into at least one radiation detector.

The system comprises a chamber for receiving and housing a container of tritium gas, a reservoir for receiving a sample of gas from said chamber, means for concentrating and heating said sample in said reservoir, means for forming a vacuum in said system and means for detecting tritium gas in said sample.

DESCRIPTION OF THE DRAWING

For a better understanding of the present invention, reference should be had to the following detailed discussion and drawing in which.

DESCRIPTION OF THE PREFERRED EMBODIMENT

Figure 1:
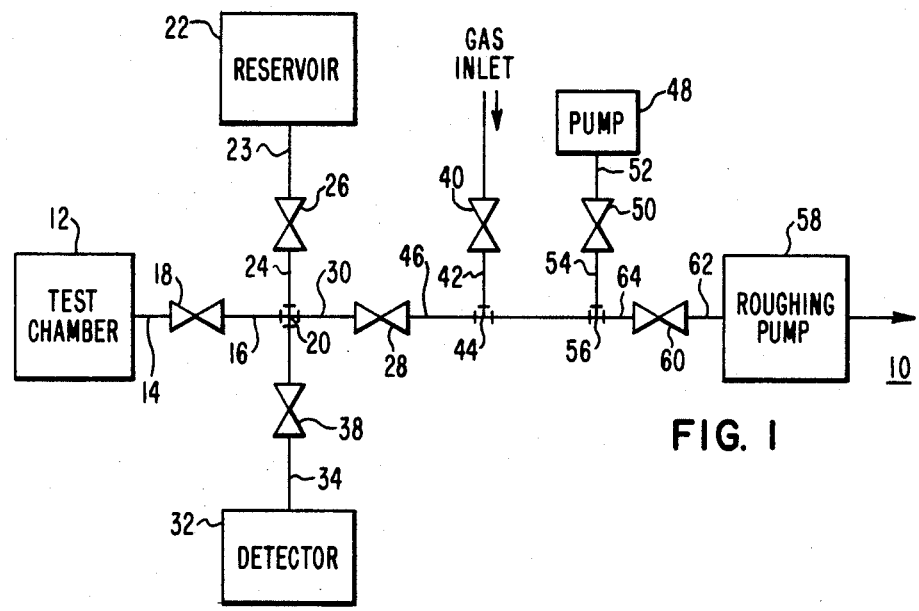
FIG. 1 is a schematic diagram of a system for carrying out the method of this invention.

With reference to FIG. 1, there is shown schematically a system 10 for practicing the teachings of this invention.

Generally, the system 10 functions by concentrating any tritium gas escaping from a container of tritium gas in a reservoir for a predetermined time interval.

The chamber 12 is then valved off or closed. The reservoir is heated to release the gas which is then passed into at least one of two radiation detectors to determine the presence and amount of radioactive gas.

More specifically, in the system 10 of FIG. 1 there is a test chamber 12. An example of a suitable test chamber 12 is one of stainless steel, having a volume of approximately ten liters and being capable of being sealed air-tight.

The test chamber 12 is connected through stainless steel tubing 14 and 16 and valve 18 to intersection 20.

A reservoir 22 is connected through stainless steel tubing 23 and 24 and valve 26 to intersection 20.

The reservoir 22 may be comprised of a stainless steel housing containing a suitable getter material, as for example zirconium wire. The zirconium wire is disposed about a suitable heater, as for example, a tungsten heater. The heater component of the reservoir should be capable of heating the reservoir to a temperature of from 400° C. to 500° C.

A suitable reservoir is sold commercially by Westinghouse Electric Corporation under the designation WL-24345.

A valve 28 is connected inline with intersection 20 through stainless steel tubing 30.

A detector 32 is connected through stainless steel tubing 34 and 36 and valve 38 with intersection 20.

The detector 32 may be either a proportional counter designed for low sensitivity measurements, as for example, the proportional counter sold commerically by Westinghouse Electric Corporation under the designation WL-24337, or a moderately large volume ionization chamber, as for example the ionization chamber sold commercially by Westinghouse Electric Corporation under the designation WL-24334.

If the detector 32 is the proportional counter sold by Westinghouse under the designation WL-24337, a pulse amplification and discrimination system can be used with the counter.

The output of the detector 32 is coupled to a preamplifier. A suitable preamplifier is one sold commercially by Tennelec under the designation TC 175.

The output of the preamplifier is coupled to the input of a linear amplifier. Pulse shaping can be adjusted for longer durations because count rates will be low. A suitable linear amplifier is one sold commercially by Ortec under the designation Model 572.

The shaped output from the linear amplifier is connected to the input of a single channel analyzer. A suitable single channel analyzer is one sold commercially by Ortec under the designation Model 551.

The discriminator output pulse produced by the single channel analyzer is counted by a counter timer such as one sold commercially by Ortec under the designation Model 874.

The gas amplification factor of the WL-24337 counter is a function of the fill gas, the fill gas pressure, and the applied voltage. The gas amplification factor determines the magnitude of the pulse produced by an ionizing event.

To optimize the performance of the proportional counter a gas multiplication plot should be obtained using the fill gas and fill pressure selected for operation. A gas gain of 300 is desired for most applications.

To measure the gas multiplication performance, it is necessary to measure the current drawn by the counter as a function of the applied voltage. This may be accomplished by placing a Keithley Model 600B electrometer in series with the proportional counter.

A source of 99.99% pure nitrogen (not shown) is connected through valve 40 and stainless steel tubing 42 to intersection 44. Intersection 44 is connected inline through stainless steel tubing 46 to valve 28.

A vacuum-ion (vac-ion) pump 48 is connected through valve 50 and stainless steel tubing 52 and 54 to intersection 56.

A suitable vac-ion pump is one sold commercially by Varian under the designation 911-5005. The vac-ion pump is powered by a suitable power supply such as a power supply sold commercially by Varian under the designation 921-0002.

A roughing vacuum pump 58 is connected inline by valve 60 and stainless steel tubing 62 and 64 with intersection 56.

The roughing pump 58 should be capable of establishing a vacuum of at least $10^{-3}$ torr in the reservoir and the vac-ion pump 48 should be capable of further reducing the vacuum to at least $10^{-6}$ torr.

The valves 18, 26, 28, 38, 50 and 60 may be butterfly bellows valves of the type sold commercially by NUPRO under the designation 304-24VFBG. The valve 40 may be a valve sold commercially by NUPRO under the designation SS 4H.

The system 10 functions by accumulating leaking tritium gas in the getter reservoir 22 and subsequently releasing the accumulated tritium into the detector 32 where the level of radiation is monitored as an indication of the presence of the tritium leak.

Specifically, in activating the system 10, all the valves (18, 26, 28, 38, 40, 50 and 60) in the system 10 are closed.

A sealed container of tritium gas to be tested for leakage is sealed into the test chamber 12.

A source of 99.99% pure nitrogen (not shown) is connected to the gas inlet valve 40. The gas source should be capable of delivering approximately one atmosphere of pressure.

The roughing pump 58 is then started. Valve 60 is opened first and when a vacuum of approximately $10^{-3}$ torr is realized valve 28 is opened and the remainder of the vacuum line is pumped down to a vacuum of approximately $10^{-3}$ torr.

Valve 38 is then opened and the detector 32 is pumped down to approximately $10^{-3}$ torr. Then valve 26 is opened and the reservoir 22 is also pumped down to a vacuum of approximately $10^{-3}$ torr.

Valve 60 is then closed, the roughing pump 58 is shut down and the vac-ion pump 48 is employed to pump the system down to a vacuum of at least $10^{-6}$ torr.

After the system is pumped down to a vacuum of at least $10^{-6}$ torr, valves 26, 28, 38 and 50 are closed and the vac-ion pump 48 is allowed to run while isolated by valve 50.

Valves 40 and 28 are then opened allowing the nitrogen gas into the vacuum system between the detector and the reservoir. The valve 38 is opened and if the detector 32 is an ion chamber the pressure in the ion chamber is brought to 15 psia 10%.

If the detector 32 is a proportional counter, the operating point will depend upon the fill gas, operating pressure and level of applied voltage. The preferred way to determine the operating point is to place a typical source of ionization near the detector and measure the current as a function of voltage for several convenient fill pressures beginning with 3 psia. The current obtained at applied voltages of from 50 to 100 Vdc is taken as the fundamental level of ionization. As the voltage increases, the current begins to increase. The ratio of the increased current to the fundamental current is the gas multiplication factor. The operating pressure and voltage should be selected to obtain a multiplication of approximately 300.

The minimum gas pressure suggested is based upon the range of tritium beta particles in nitrogen. A range of less than one-half of the inner diameter of the housing is considered acceptable. Nitrogen is used as the fill gas to provide reasonable pumping speeds and avoid contamination of the system with carbon compounds. The absence of polyatomic molecules in the fill gas does make the proportional counter more susceptible to spurious counts as a result of wall effects. If spurious counts are encountered, the ratio of the voltage to gas pressure in the counter should be reduced. The output of the proportional counter should be recorded as counts per unit time. A counting period of 10 minutes is calculated to provide 99% certainty of detecting a leak rate of $2.6 \times 10^{-13}$ ci/sec with a 9% band of uncertainty. For $2.6 \times 10^{-14}$ ci/sec and a 10 minute counting period it is 99% certain that the leak rate lies between $3.4 \times 10^{-14}$ ci/sec and $1.82 \times 10^{-14}$ ci/sec. The sensitivity of the system has been calculated to be a minimum of 6.5 counts/microcurie.

The valve 38 is then closed and the system is again pumped down to a vacuum of $10^{-6}$ torr using the procedure described above.

All valves are then closed down. Valves 18 and 26 are then opened and any tritium gas escaping from the container in chamber 12 is collected in the reservoir 22. The collection period is continued for approximately ten minutes. Valves 18 and 26 are then closed and valves 26 and 38 are opened. The heater in the reservoir 22 is activated to heat the zirconium to a temperature of from 400° C. to 500° C., releasing the accumulated tritium gas from the zirconium.

The evolved gas flows from the reservoir 22 to the detector 32 and any radioactive tritium gas is detected and measured by comparing current or counts versus time to data previously obtained using a calibrated leak source.

Figure 2:
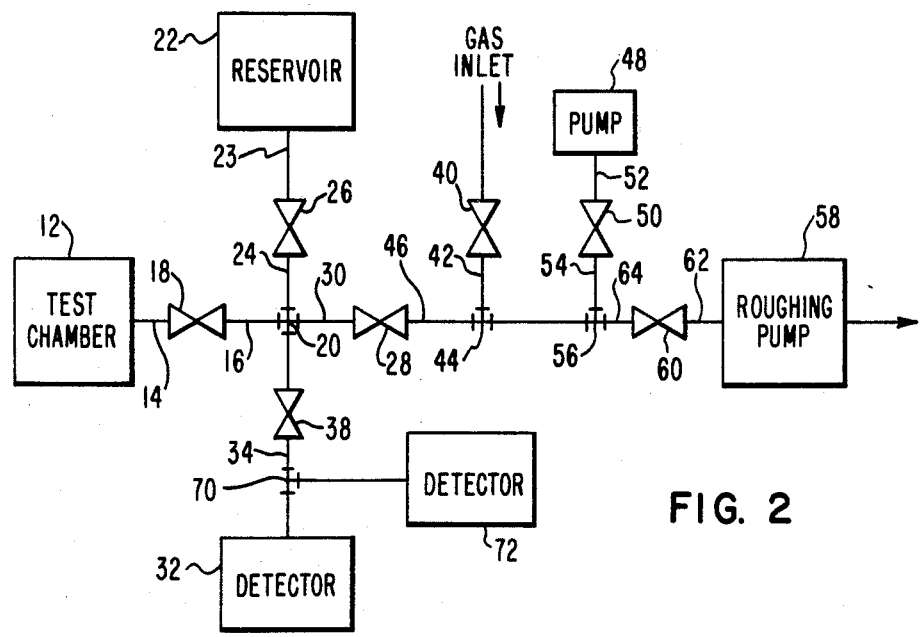
FIG. 2 is a schematic diagram of a modification of the system of FIG. 1.

With reference to FIG. 2, if desired a "T" valve 70 can be inserted into stainless steel tubing 34 and a second detector 72 can be included in the system.

The inclusion of this second detector 72 allows the sample of tritium gas to be split and passed through both an ionization chamber and a proportional counter. The two detectors act as checks on each other.

If two detectors are used, a longer collection period should be used to ensure an adequate sample.

We claim as our invention:

1. A method for detecting and measuring a tritium gas leak from a sealed container comprising, disposing a sealed container of tritium gas in a chamber, collecting and concentrating a sample of gas from said chamber in a reservoir and passing said sample into at least one radiation detector.

2. The method of claim 1 in which the reservoir contains a tritium gettering material.

3. The method of claim 2 in which the reservoir is heated to release tritium gas the gettering material prior to passing the tritium gas into said at least one radiation detector.

4. The method of claim 3 in which the radiation detector is selected from the group consisting of ionization chambers and proportional counters.

5. The method of claim 3 in which there are two detectors, one of which is an ionization chamber and the other of which is a proportional counter.

6. A system for detecting and measuring a tritium gas leak comprising:
(1) a chamber for receiving and containing a container of tritium gas;
(2) a reservoir for receiving a sample of gas from said chamber;
(3) means for concentrating and heating said sample in said reservoir;
(4) means for forming a vacuum in said system; and
(5) means for determining if said sample contains tritium gas.

7. The system of claim 6 in which the means for concentrating said sample in said reservoir is a gettering material which sorbs the tritium.

8. The system of claim 7 in which the means for determining if said sample contains tritium gas is an ionization chamber.

9. The system of claim 7 in which the means for determining of said sample contains tritium gas is a proportional counter.

10. The system of claim 7 in which the means for determining if said sample contains tritium gas consists of an ionization chamber and a proportional counter.

* * * * *